June 22, 1965  H. A. GUTHANS  3,190,704
STERN BEARING PACKING GLANDS
Filed June 7, 1961

INVENTOR
Harold A. Guthans

June 22, 1965   H. A. GUTHANS   3,190,704
STERN BEARING PACKING GLANDS
Filed June 7, 1961                                    2 Sheets-Sheet 2

INVENTOR
Harold A. Guthans

United States Patent Office 3,190,704
Patented June 22, 1965

3,190,704
STERN BEARING PACKING GLANDS
Harold A. Guthans, 2201 Springhill Ave., Mobile, Ala.
Filed June 7, 1961, Ser. No. 115,404
5 Claims. (Cl. 308—36.2)

This invention relates to stern bearing packing glands and particularly to a novel stern bearing packing gland which incorporates packing assembly free of contact with the propeller shaft. The stern bearing of a water-going vessel performs a very vital function under extremely difficult conditions. Not only is it subject to failure from the corrosive action of water and contamination and abrasive action of sand and other particles found in the water, but also, it is subject to premature failure from the wearing characteristics of its own parts. Long observation and experimentation has shown that failure of conventional stern bearing glands very often results from the fact that the propeller shaft from the time it is initially installed wears most heavily on the packing material particularly at the bottom. As the time goes on wear takes place both in the bearing and the packing and causes the propeller shaft to bear even more heavily on the packing material. The effect of this on the packing material is that the packing material becomes too tightly packed at the bottom. In addition, the rotation of the propeller shaft draws down the packing material from above in the direction of the rotation of the shaft and thus packs or tucks in more packing material under the propeller shaft making it even tighter at the bottom, sometimes to the extent that the propeller shaft is riding on the packing material instead of the stern bearing, which may cause the packing material to burn up. The corresponding effect on the packing at the top is, of course, just the reverse. The packing material at the top becomes too loose and eventually leakage occurs. Deterioration of the conventional gland proceeds in geometric progression, i.e., the more the bearing wears down, the more it tucks the packing, and the more it tucks the packing the sooner it leaks at the top and once leakage occurs deterioration of the gland is very rapid.

In addition, grooving of the propeller shaft adjacent the packing material is often the result of the packing material being tucked and packed down hard at the bottom of the propeller shaft.

The present invention provides a stern bearing gland which overcomes these problems and successfully eliminates the packing down and tucking of the packing material at the bottom of the shaft along with the deteriorating effects thereof by eliminating the pressure on the packing material around the entire circumference of the propeller shaft. In a preferred embodiment of my invention I provide an annular housing surrounding a propeller shaft and extending from a bearing surrounding the propeller shaft, a packing carrier means within the housing and surrounding the propeller shaft movable with the propeller shaft in directions both substantially parallel and substantially transverse to the axis of the propeller shaft, an annular well in said carrier means radially spaced from the shaft, packing means in said well, and axial bearing means on the shaft slidable in said well and resiliently bearing on the packing means.

Other details, objects and advantages of the invention will become apparent as the following description of a present preferred embodiment thereof proceeds.

In the accompanying drawings, I have shown a present preferred embodiment of the invention in which FIGURE 1 is a longitudinal section through a stern bearing and propeller shaft assembly of a water borne vessel showing the packing gland of my invention;

Figure 1:
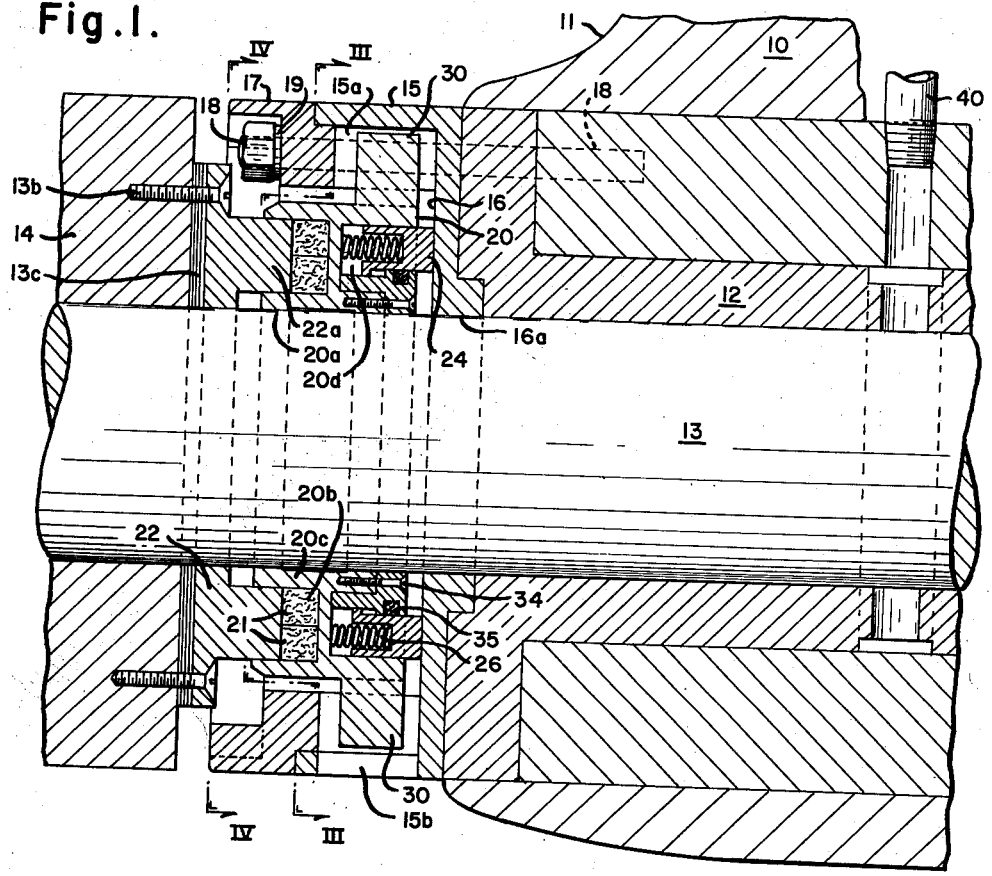
Figure 2:
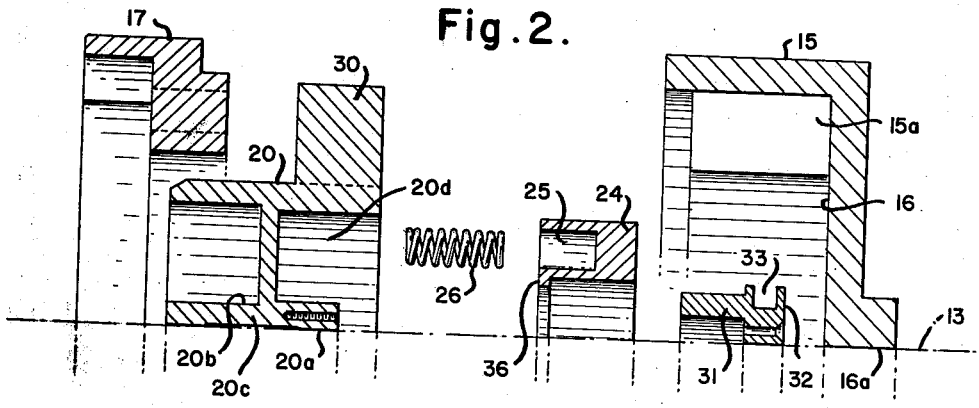
FIGURE 2 is a segmental exploded section through the packing carrier means.
Figure 3:
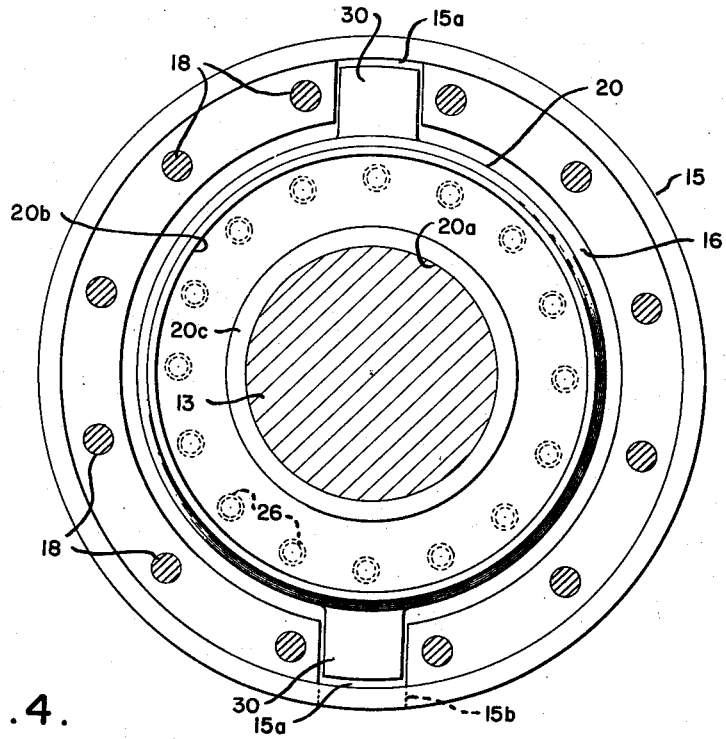
FIGURE 3 is a section on the line III—III of FIGURE 1.
Figure 4:
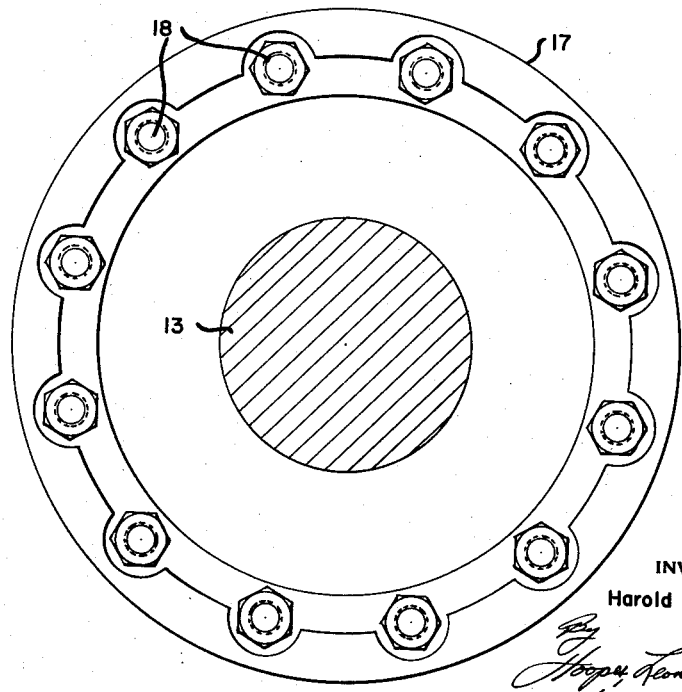
FIGURE 4 is a section on the line IV—IV of FIGURE 1.

Referring now to the drawings and in particular to FIGURE 1, a water borne vessel 10 having a propeller hull boss or strut portion 11 is provided with a stern bushing 12 of bronze or other suitable material fitted into the propeller hull boss or strut. The propeller shaft 13 passes through the bushing 12 and extends outwardly from the hull boss or strut carrying the propeller 14. A bearing gland housing assembly 15 made up of an inner face plate 16, and an outer cap 17 is fixed to the stern bushing 12 and hull boss or strut 11 by bolts 18. Siutable lock washers 19 may be provided to insure good attachment. Propeller shaft 13 passes through opening 16a in the inner face plate 16.

Within housing 15, I provide an annular packing carrier ring 20 having an opening 20a through which propeller shaft 13 passes. Carrier ring 20 contains a well section 20b spaced from and parallel to the propeller shaft within which packing material 21 such as flax or other suitable substance is placed. The well section 20b is separated from the shaft 13 by an axial wall section 20c. A packing retainer ring 22 fits around and is fixed to the propeller shaft and carries an axial flange or sealing ring member 22a which partially extends into the well 20b of carrier ring 20. Retainer ring flange 22a is freely slidable in opening 20b to bear against and to seal packing material 21 in said well section. Retainer ring 22 is preferably fixed to the propeller hub 13a by bolts 13b and is positioned by removable shims 13c.

Between inner face plate 16 and packing carrier ring 20 is positioning ring 24 which fits within a second annular well 20d of packing carrier ring 20. Spaced around the positioning ring 24 are a series of holes 25. Within holes 25 of the positioning ring 24 are located springs 26 which constantly urge positioning ring 24 away from packing carrier ring 20. Thus positioning ring 24 is constantly urged against inner face plate 16 while packing carrier ring 20 and packing material 21, are constantly urged toward the retainer ring 22 thereby urging ring flange 22a tightly against packing 21.

The positioning ring 24 is freely slidable radially on inner face plate 16. Likewise, packing carrier ring 20 is freely slidable both axially and radially within axial slots 15a within outer cap 17 and gland housing 15. Thus the entire packing assembly is free to move within the housing assembly in a direction substantially perpendicular to the axis of the propeller shaft as well as axially of the shaft. As a result the weight of propeller shaft 13 is never placed upon either the carrier ring or packing material 21 even as propeller shaft 13 moves down with the passage of time but on the contrary the packing material and carrier ring 20 moves freely with the shaft. Hence the pressure on packing material 21 is substantially equalized in its contact with retainer ring 22.

The pressure on packing material 21 is further equalized due to the fact that packing carrier ring 20 is in free axially slidable engagement with packing retainer ring 22 and thus is permitted to move with propeller shaft 13 in a direction substantially parallel to the axis of the propeller shaft.

Rotation of packing carrier ring 20 is prevented by two lug like extensions 30, located on a vertical plane, one on top, the other at the bottom of packing carrier ring 20 and being integral parts thereof. These lugs 30 extend sufficiently radially from packing carrier ring 20 so as to project into spaces 15a located inside housing 15 between bolts 18 top and bottom while leaving sufficient space between the ends of lugs 30 and housing 15 so that packing carrier ring 20 is left free to move in directions moderately transverse and substantially parallel to the axis of propeller shaft 13 but is restrained from rotating with the propeller shaft by the attachment of its lugs 30 within spaces 15a. The bottom space 15a is opened at 15b through the wall of housing 15 to provide a drainage passage.

A guide ring 31 having a radially extending flange 32 carrying a well 33 is fixed to carrier ring 20 by bolts 34. A bronze piston ring 35 is fitted in well 33 in contact with the positioning ring 24. An annular flange 36 on positioning ring 24 acts to co-operate with flange 32 to limit the outward movement of positioning ring 24.

Lubricant is delivered under pressure to the stern bearing 12 cut through line 40. The lubricant is forced outward through the bearing and into the packing assembly so that grease under pressure is at all times being urged outwardly around the several members and between the packing 21 and tongue or flange 22a.

While I have shown and described a present preferred embodiment of the invention it is to be distinctly understood that the invention is not limited thereto but may be otherwise variously embodied within the scope of the following claims.

I claim:

1. A bearing gland for propeller shafts and the like subject to external pressure comprising a housing means extending from a bearing surrounding a propeller shaft, packing carrier means within said housing and surrounding said propeller shaft movable with the propeller shaft in all directions substantially parallel and transverse to the axis of the propeller shaft, an annular well in said carrier means spaced from and parallel to the shaft, a retainer ring fixed to the shaft and having an axially extending annular flange spaced from and movable with the propeller shaft slidable in said well and packing means in the well slidably sealingly contacting the flange and resilient positioning means in the housing between the carrier means and housing resiliently urging said carrier and packing toward the flange.

2. A bearing gland for propeller shafts and the like subject to external pressure comprising a hollow housing assembly extending from a bearing surrounding a propeller shaft, a packing carrier ring element within said housing assembly and surrounding the propeller shaft, said packing carrier ring element having an extension in loose engagement with the housing assembly whereby the packing carrier ring element is substantially prevented from rotating with the propeller shaft, a well section in said packing carrier ring element surrounding and spaced from the propeller shaft packing material within said well section, a packing retaining ring element fixed to and movable with the propeller shaft and a sealing ring member within the housing and coaxial with the packing carrier ring element, a positioning ring means within the housing and carrier ring element resiliently engaging said housing and urging said packing carrier ring element toward the packing retaining ring element whereby the packing carrier ring element, positioning ring means, packing material, and packing retaining ring element are sufficiently free to move with the propeller shaft in directions both substantially parallel and substantially transverse to the rotational axis of the propeller shaft.

3. A bearing gland for propeller shafts and the like subject to external pressure comprising a hollow housing assembly extending from a bearing surrounding a propeller shaft, a packing carrier ring element within the housing assembly and surrounding the propeller shaft, said packing carrier ring element containing a lug-like extension on its outer periphery in loose engagement with said housing assembly whereby the packing ring element is substantially prevented from rotary movement without impeding parallel and transverse movement in relation to its axis, a well section in said packing carrier ring element adjacent the propeller shaft, packing material in said well section, a packing retaining ring element and sealing ring member all surrounding and moving with the propeller shaft, a positioning ring means within the housing and carrier ring element resiliently engaging the housing and urging said packing carrier ring element toward the retaining ring element whereby the packing ring element, the positioning ring means, and the packing material are sufficiently free to move with the propeller shaft in directions both substantially parallel and substantially transverse to the rotational axis of the propeller shaft.

4. A bearing gland for propeller shafts and the like subject to external pressure comprising a hollow cylindrical housing assembly extending from a bushing surrounding a propeller shaft, a packing carrier ring element within the housing assembly and surrounding the propeller shaft, said packing carrier ring element containing at least one lug-like extension on its outer periphery in loose engagement with said housing assembly whereby the packing carrier ring element is substantially restrained from rotating without impairing its movement with the propeller shaft, in directions both substantially parallel and substantially transverse to the rotational axis of the propeller shaft, an annular well section in said packing carrier ring element spaced from the propeller shaft, packing material within said well section surrounding the propeller shaft and in contact therewith, a packing retaining ring means, a sealing ring member on said packing retaining ring means fitting in said well means, said packing retaining and sealing ring surrounding and movable with the propeller shaft, a positioning ring means within the housing assembly surrounding a portion of the packing carrier ring element in sliding engagement, spring means between the packing carrier ring element and positioning ring means whereby they are each urged away from the other toward their respective sides of the housing asembly, said packing carrier ring element, positioning ring means, and the packing material being free to move with the propeller shaft in directions both substantially parallel and substantially transverse to the rotational axis of the propeller shaft.

5. A bearing gland for propeller shafts and the like subject to external pressure comprising a hollow cylindrical housing assembly of inner and outer portions united by fastening means in substantially rigid engagement with a stern bushing both of which surround a propeller shaft, a packing carrier ring element within the housing assembly and surrounding the propeller shaft, said packing carrier ring element containing at least one lug element on its outer periphery in loose engagement with said housing assembly whereby the packing ring element is substantially restrained from rotating with the propeller shaft without impairing its movement with the propeller shaft in directions both substantially parallel and transverse to the rotational axis of the propeller shaft, a first annular well section in said packing carrier ring element adjacent to and surrounding the propeller shaft, packing material in said well section, a packing retaining ring element surrounding said propeller shaft and partially within said well section, a second annular well section within said packing carrier ring element adjacent to and surrounding said propeller shaft, a sealing ring member on said packing carrier ring element partially within said second annular well section, a positioning ring element within the housing assembly surrounding a portion of the sealing ring member and in slidable engagement therewith, spring means between the packing carrier ring element and positioning ring element whereby the packing carrier ring element urges the packing retaining ring element against the packing material within the first well section of the carrier ring while the positioning ring means is urged against the inside of the inner portion of the housing assembly in a sliding engagement therewith whereby the carrier ring element and positioning ring member within the housing assembly are free to move with the propeller shaft in directions substantially parallel and substantially transverse to the rotational axis of the propeller shaft.

References Cited by the Examiner

UNITED STATES PATENTS

| | | | |
|---|---|---|---|
| 2,186,537 | 1/40 | Salisbury | 277—97 |
| 2,383,862 | 8/45 | Hornschuch | 277—91 |
| 2,882,104 | 4/59 | Guthans | 308—36.2 |
| 3,011,835 | 12/61 | Guthans | 308—361 |

ROBERT C. RIORDON, *Primary Examiner.*

FRANK SUSKO, *Examiner.*

UNITED STATES PATENT OFFICE
CERTIFICATE OF CORRECTION

Patent No. 3,190,704

June 22, 1965

Harold A. Guthans

It is hereby certified that error appears in the above numbered patent requiring correction and that the said Letters Patent should read as corrected below.

Column 2, line 15, for "Siutable" read -- Suitable --; column 3, line 3, strike out "its"; line 13, strike out "cut"; line 49, after "shaft" insert a comma; column 4, line 36, for "asembly" read -- assembly --.

Signed and sealed this 30th day of November 1965.

(SEAL)
Attest:

ERNEST W. SWIDER
Attesting Officer

EDWARD J. BRENNER
Commissioner of Patents